(12) United States Patent
Ehmann

(10) Patent No.: US 8,772,642 B2
(45) Date of Patent: Jul. 8, 2014

(54) CONTROL CABINET

(75) Inventor: Bruno Ehmann, Mögglingen (DE)

(73) Assignee: Icotek Project GmbH & Co, KG, Mogglingen (DE)

( * ) Notice: Subject to any disclaimer, the term of this patent is extended or adjusted under 35 U.S.C. 154(b) by 125 days.

(21) Appl. No.: 13/463,379

(22) Filed: May 3, 2012

(65) Prior Publication Data

US 2012/0280606 A1    Nov. 8, 2012

(30) Foreign Application Priority Data

May 3, 2011  (DE) .......................... 10 2011 100 345

(51) Int. Cl.
*H01B 17/38*       (2006.01)
(52) U.S. Cl.
USPC ..................... 174/153 G; 174/152 G; 174/50; 439/604; 277/606
(58) Field of Classification Search
USPC ................ 174/50, 152 G, 153 G; 16/2.1, 2.2; 439/604; 277/606
See application file for complete search history.

(56) References Cited

U.S. PATENT DOCUMENTS 5,422,436 A * 6/1995 Zachrai .......................... 174/666

FOREIGN PATENT DOCUMENTS

| DE | 101 12 110 B4 | 10/2004 |
| EP | 1 376 795 A2 | 1/2004 |
| EP | 1 811 625 A1 | 7/2007 |
| EP | 1 794 857 B1 | 8/2009 |
| WO | 99/06747 A1 | 2/1999 |

OTHER PUBLICATIONS

Examination Report dated Jan. 12, 2012 for German Patent Application No. 10 2011 100 345.6 (6 pages).

* cited by examiner

*Primary Examiner* — Dhirubhai R Patel
(74) *Attorney, Agent, or Firm* — Taylor IP, P.C.

(57) ABSTRACT

A control cabinet includes at least two plate shaped elongated wall segments. At least one wall segment features at least one open-edged cutout. Edges of adjacent wall segments facing each other, adjoin each other, forming a seal. Each cutout is covered by a frame. The frame includes a plurality of grommets to accommodate cables. In an assembled state each frame is enclosed and each frame protrudes beyond the butt joint between adjacent wall segments, covering same.

4 Claims, 5 Drawing Sheets

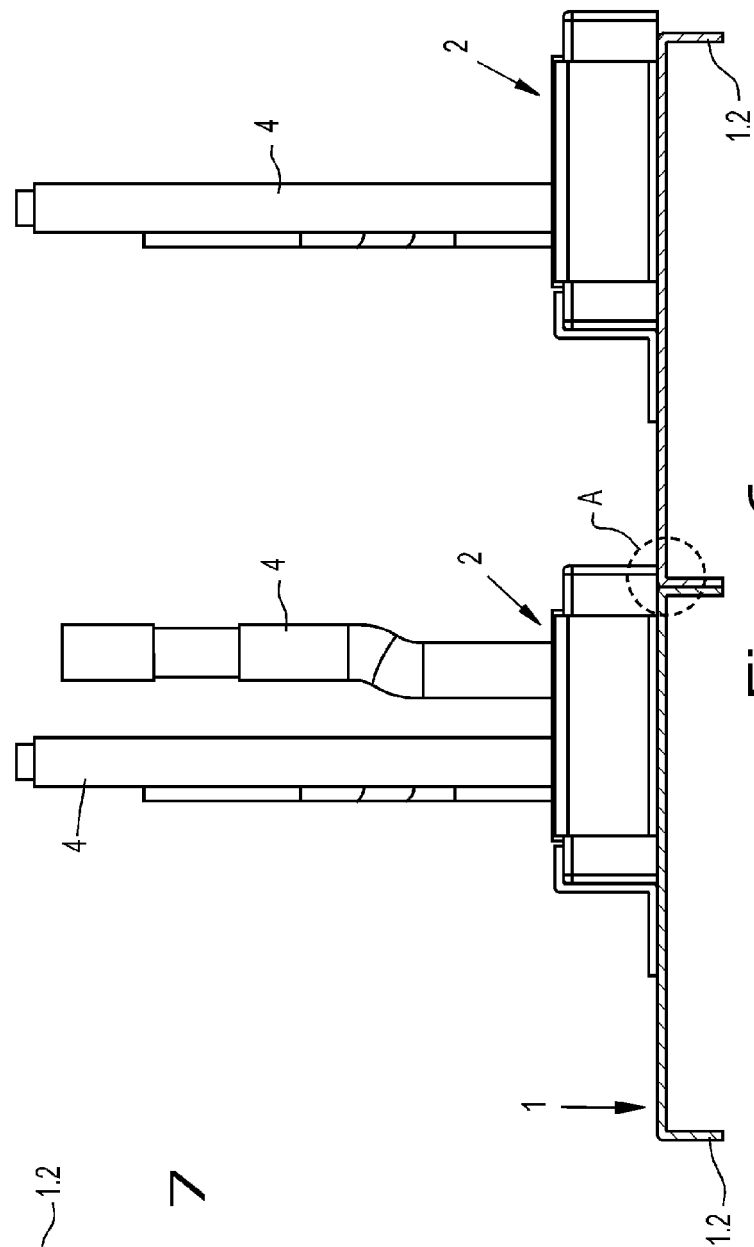
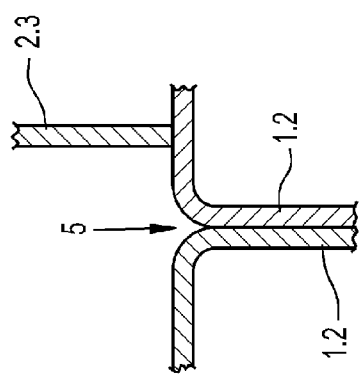

CONTROL CABINET

BACKGROUND OF THE INVENTION

1. Field of the Invention

The present invention relates to a control cabinet having at least two elongated, plate shaped wall segments, whose longitudinal sides adjoin each other.

2. Description of the Related Art

An arrangement of such a control cabinet is described in EP 1 794 857 B1. Here, the U-shaped frame extends with the ends of both its U-legs at least to the defining line of the open-edged cutout in the wall segment, or protrudes beyond it. The U-shaped frame is open on one side. In an assembled state, adjacent wall segments adjoin each other, forming a seal. The U-shaped frame of the preceding wall segment and thereby also the grommets located in it are held in their position by the following wall segment. The reciprocal fastening of the two wall segments presents a problem. On the one hand it must be tight; on the other hand it must have sufficient strength, A control cabinet is known from DE 101 12 110 B4. This comprises a single wall segment which is provided with an open-edged cutout. The open-edged cutout again accommodates a U-shaped frame which contains fire protection elements that surround the cables. With its contour the frame is adapted to the open-edged cutout. Apart from the fact that the control cabinet fulfills the special function of fire safety, there is a lack of additional plate-shaped wall segments, as referred to in the aforementioned documentation.

EP 1 811 625 A1 describes a control cabinet having two plate shaped wall segments which—in a top view—are U-shaped. The two U-shaped parts are connected in a way that the legs of the one part adjoin the legs of the other part.

Additional relevant patent rights are cited in DE 101 12 110 B4, EP 1 794 857 B1, EP 1 376 795 A2 and WO 99/06747. In all these devices there is a butt joint between adjacent wall segments which must be sealed.

What is needed in the art is a control cabinet which is configured so that adjacent wall components can be adjoined mechanically reliably and at the same time create a seal.

SUMMARY OF THE INVENTION

The present invention provides a control cabinet including at least two plate shaped, elongated wall segments. At least one wall segment has at least one open-edged cutout. Each cutout is covered by a closed frame. The frame is therefore not U-shaped, but box-shaped. It can however also be formed by two U-shaped partial frames. A frame is also conceivable which consists of one U-shaped part and one cross bar covering the legs of the U. In an assembled state each frame is enclosed. The frame protrudes beyond the gap between two adjacent wall segments and includes a plurality of grommets to accommodate cables. A reliable mutual support of the two wall segments can hereby be achieved. Even if pressure is exerted upon the adjoined wall segments, substantial deflection of the entire construction is avoided.

The wall segment covering the gaps may extend relatively far beyond the adjacent wall segment. In any event, the entire curved region of the adjacent wall segment should be covered. Coverage of only one or 2 millimeters (mm) is as a rule not sufficient. In general more than 2 mm are necessary as a measure for coverage, for example, approximately 3 or 4 or more millimeters.

The configuration of the frame as a box-type structure is possible, in addition to a U-shape or in other words to an open structure. The box-shaped frame—single component or consisting of two partial frames—is substantially more stable. It is also more advantageous for assembly. The frame can therefore be equipped with grommets and cables totally outside the control cabinet.

The frame can be fastened to the wall segment in various ways. For example, guide rails can be provided which are firmly connected with the wall segment and which are arranged such that the frame can be inserted from the open side of the open-edged cutout. The frame is hereby located above the wall segment and completely covers the open-edged cutout.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 illustrates an elevation view of part of the control cabinet showing the narrow sides of two joined wall segments with associated frames according to the present invention;

FIG. 7 is an enlarged detail A from the object in FIG. 6; and

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
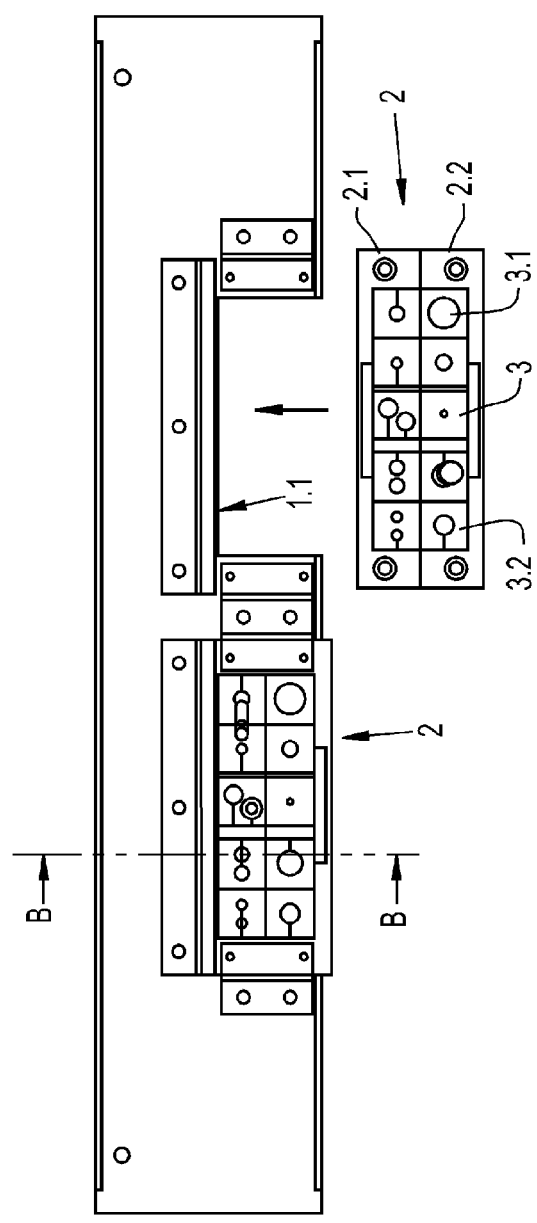
FIG. 1 illustrates a top view of a wall segment with two frames—the one frame connected with the wall segment and the other during insertion onto the wall segment.
Figure 4:
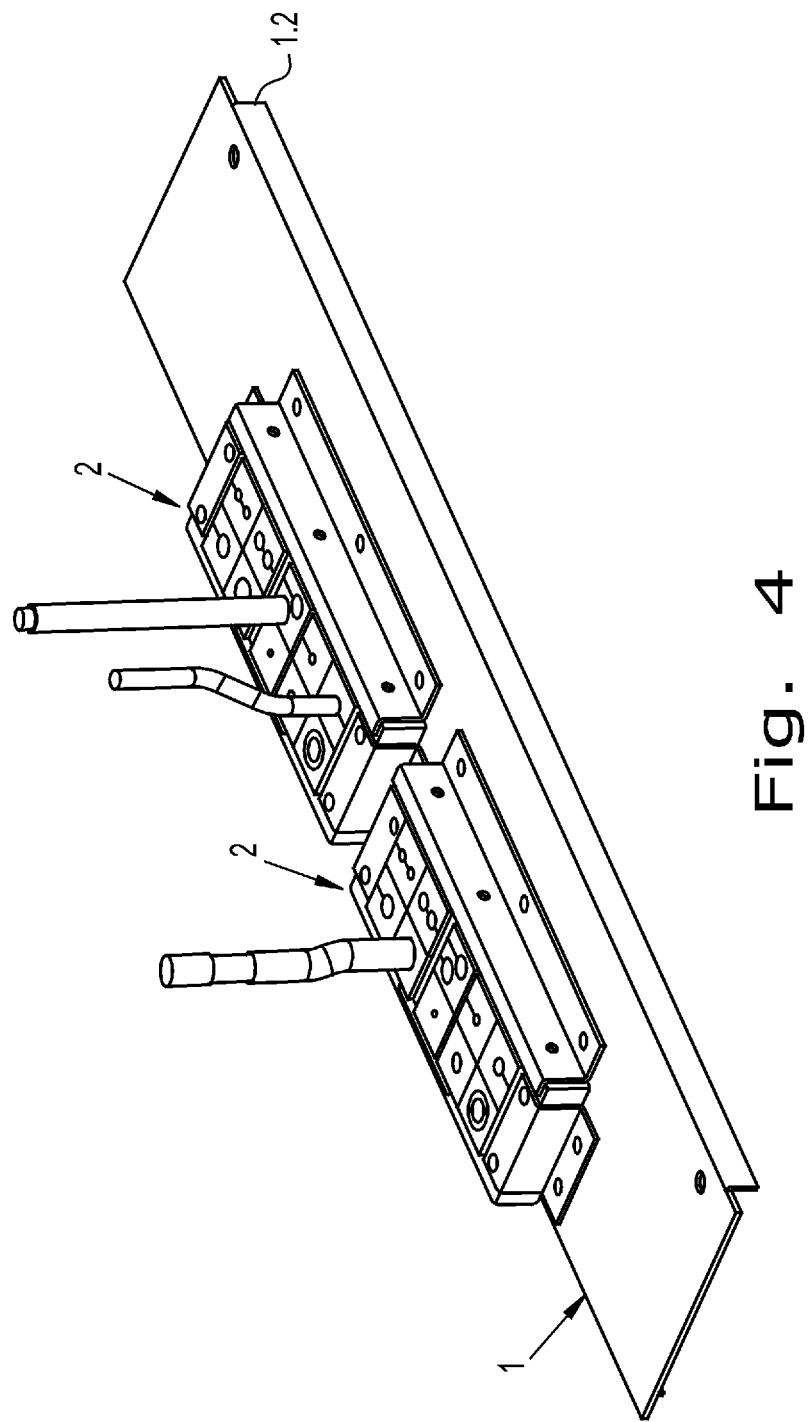
FIG. 4 illustrates a perspective illustration of the wall segment according to FIGS. 1 through 3 with the two mounted frames.

Referring now to the drawings, and more particularly to FIG. 1, there is shown a wall segment including two open-edged cutouts 1.1, only one of which is recognizable. The left cutout in the drawing is not visible since it is already covered by frame 2. The right frame is pushed onto wall segment 1, straight in the direction of the arrow in order to cover right cutout 1.1.

Figure 3:
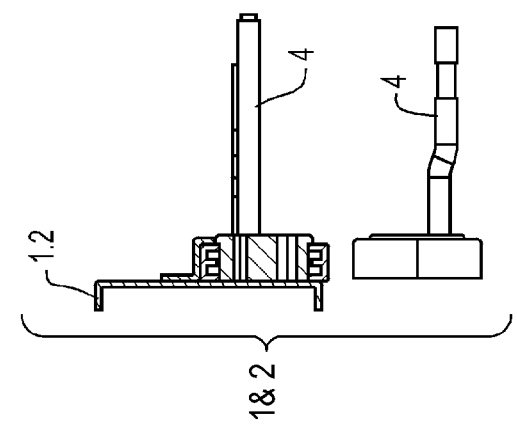
FIG. 3 illustrates a view of the object of FIG. 1 according to intersection B-B.
Figure 2:
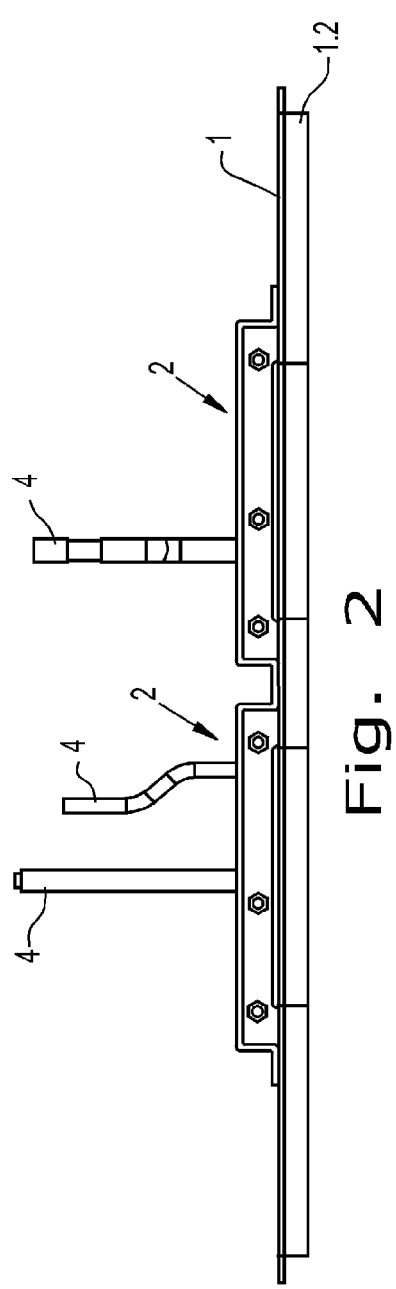
FIG. 2 illustrates an elevation of the object in FIG. 1.

Frames 2 are assembled from frame sections 2.1, 2.2. Each frame section is U-shaped. Frame 2 is provided with a plurality of grommets 3. Each grommet is configured in a known fashion. It is formed of an elastomer material, for example rubber. It includes at least one feed-through opening 3.1 and in addition aperture 3.2 which enables opening of the grommet to accommodate cable 4. Please also refer to FIGS. 2 and 3.

Wall segment 1 is formed of sheet metal with a thickness, for example of approximately 1 mm. The wall segments are bent at right angles on their longitudinal sides so that flanges 1.2 are formed. See FIGS. 4 through 7. Each frame 2 is enclosed. It encloses grommets 3 with cables 4 at a certain tension, so that the grommets form a solid package in the frame.

Figure 5:
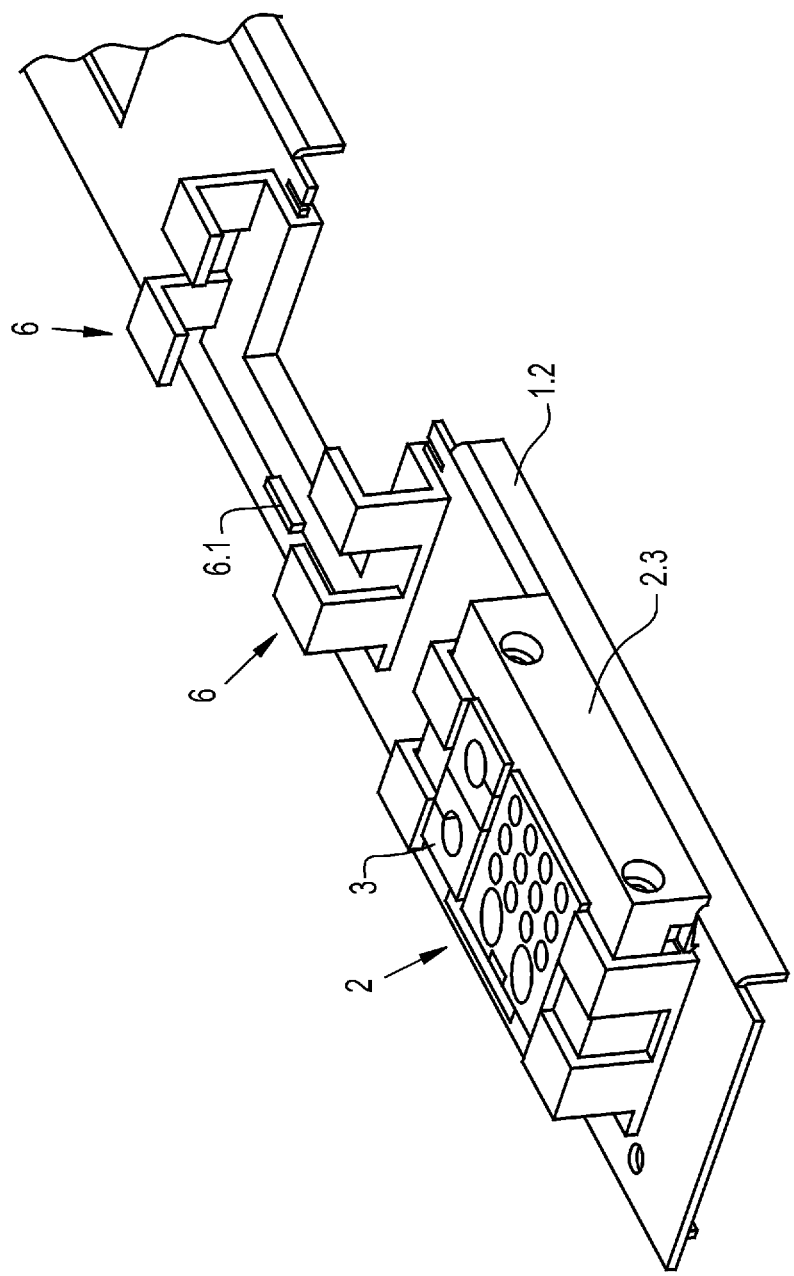
FIG. 5 illustrates a wall segment according to the present invention with an assembled frame as well as with guide elements to accommodate the frame.

In an assembled state, two adjacent wall segments 1, 1 respectively are adjoined closely along their longitudinal sides and therefore with flanges 1.2, 1.2 possibly by inserting sealing strips. See FIGS. 6 and 7. Together they form butt joint 5. Frame 2 is positioned on the respective wall segment such that open-edged cutout 1.1 is completely covered. Moreover, bar 2.3 of the frame protrudes several millimeters beyond flange 1.2 of wall segment 1. The protrusion should be a multiple of the sheet metal thickness of wall segment 1, for example 4-times or more. See FIGS. 1, 5, 6 and 7. In FIG. 5 for example, bar 2.3 protrudes beyond flange 1.2. This can be seen especially clearly in FIGS. 6 to 8.

FIG. 5 illustrates how each frame 2 can be connected to respective wall segment 1. Here, retention clamps 6 which fulfill the function of guide rails are mounted to wall segment 1. Respective frame 2 is inserted between retention clamps 6. Stop 6.1 may be provided—see FIG. 5. Moreover, individual frame 2 may be mounted by with a locking device in its operating position. Such a locking device is not illustrated. It can however be in the embodiment of a snap-in locking device. The frame illustrated in FIG. 5 includes a U-shaped part, as well as a crossbar. The cross bar is aforementioned bar 2.3

The cited complete covering of butt joint 5 by associated frame 2 should be configured, if possible, as illustrated especially clearly in FIGS. 5 and 7. Stable interlocking of wall segments 1, 1 and thereby an increase in rigidity of the entire construction including two or more wall segments occurs only when frame 2 covers adjacent wall segment 1 with its bar 2.3 to such an extent that it rests on adjacent wall segment 1 beyond the curvature.

Even though the control cabinet is described as having enclosed frames, the principle can also be applied for control cabinets having U-shaped frames which in other words are open. Hereby it is essential that each frame protrudes clearly beyond the butt joint between adjacent wall segments, for examples by four- or multiple times the thickness of the sheet metal from which the wall segment is formed.

Figure 8:
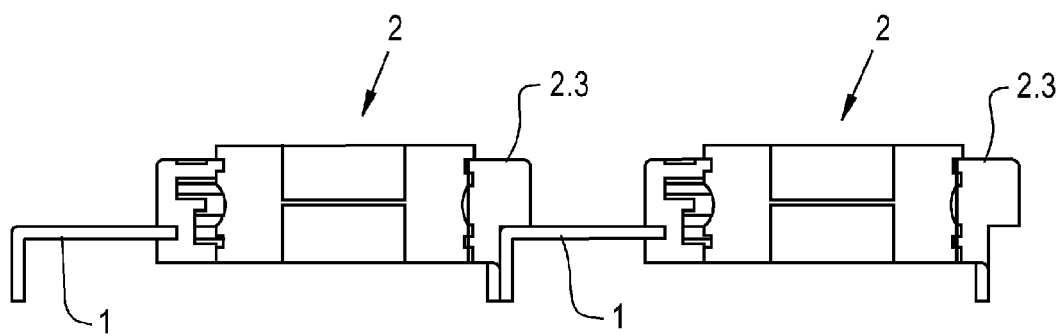
FIG. 8 illustrates two joined wall segments with associated frames according to the present invention in an elevation view of the narrow sides of the wall segments.

Referring now to FIG. 8, there is shown an object including two adjoining wall segments 1, 1. Both respectively include frame 2, 2 equipped with grommets. Each frame is equipped with a continuous groove which serves to push in or insert the frame into cutout 1.1 of wall segment 1.

Bar 2.3 features a special characteristic. It is configured in a particular way, as illustrated. Consequently bar 2.3 on the one hand fits closely against flange 1.2 of the wall segment and on the other hand against the upper horizontal surface of wall segment 1, so that an especially close and thereby tight connection is established.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING

1. Wall segment
1.1 Cutout
1.2 Flange
2 Frame
2.1 Frame section
2.2 Frame section
2.3 Bar
3 Grommet
3.1 Bore
3.2 Aperture
4 Cable
5 Butt joint
6 Retention clamp
6.1 Stop

What is claimed is:

1. A control cabinet, comprising:
at least two plate shaped elongated wall segments, at least two of said wall segments being adjacent each other, each of said wall segments having an open edged cutout, wherein an edge of adjacent said wall segments face each other, adjoin each other and form a butt joint; and a plurality of frames covering said open edge cutouts, each of said plurality of frames including a plurality of grommets to accommodate a plurality of cables, wherein at least one of said plurality of frames protrudes beyond and covers said butt joint between said adjacent wall segments and said plurality of frames being enclosed when said adjacent wall segments are in an assembled state.

2. The control cabinet according to claim 1, wherein each of said plurality of frames is separated along a plane vertical to one of said wall segments and progresses in a longitudinal direction of one of said wall segments.

3. The control cabinet according to claim 2, wherein at least one of said adjacent wall segments includes a curved region and at least one of said plurality of frames completely covers at least said curved region.

4. The control cabinet according to claim 3, wherein at least one of said wall segments is made of a sheet metal and has a thickness, at least one of said plurality of frames protruding beyond said butt joint at least by a multiple of said thickness.

* * * * *